3 Sheets--Sheet 3.

P. BLAISDELL.
Drilling-Machines.

No. 135,313. Patented Jan. 28, 1873.

WITNESSES:
E. E. Moore
F. H. Goulding.

INVENTOR:
Parritt Blaisdell

UNITED STATES PATENT OFFICE.

PARRITT BLAISDELL, OF WORCESTER, MASSACHUSETTS.

IMPROVEMENT IN DRILLING-MACHINES.

Specification forming part of Letters Patent No. 135,313, dated January 28, 1873.

*To all whom it may concern:*

Be it known that I, PARRITT BLAISDELL, of the city and county of Worcester, and Commonwealth of Massachusetts, have invented certain new and useful Improvements in Upright Drills; and I do hereby declare that the following is a full, clear, and exact description of the same, reference being had to the accompanying drawing which forms a part of this specification, and in which—

Figure 1:
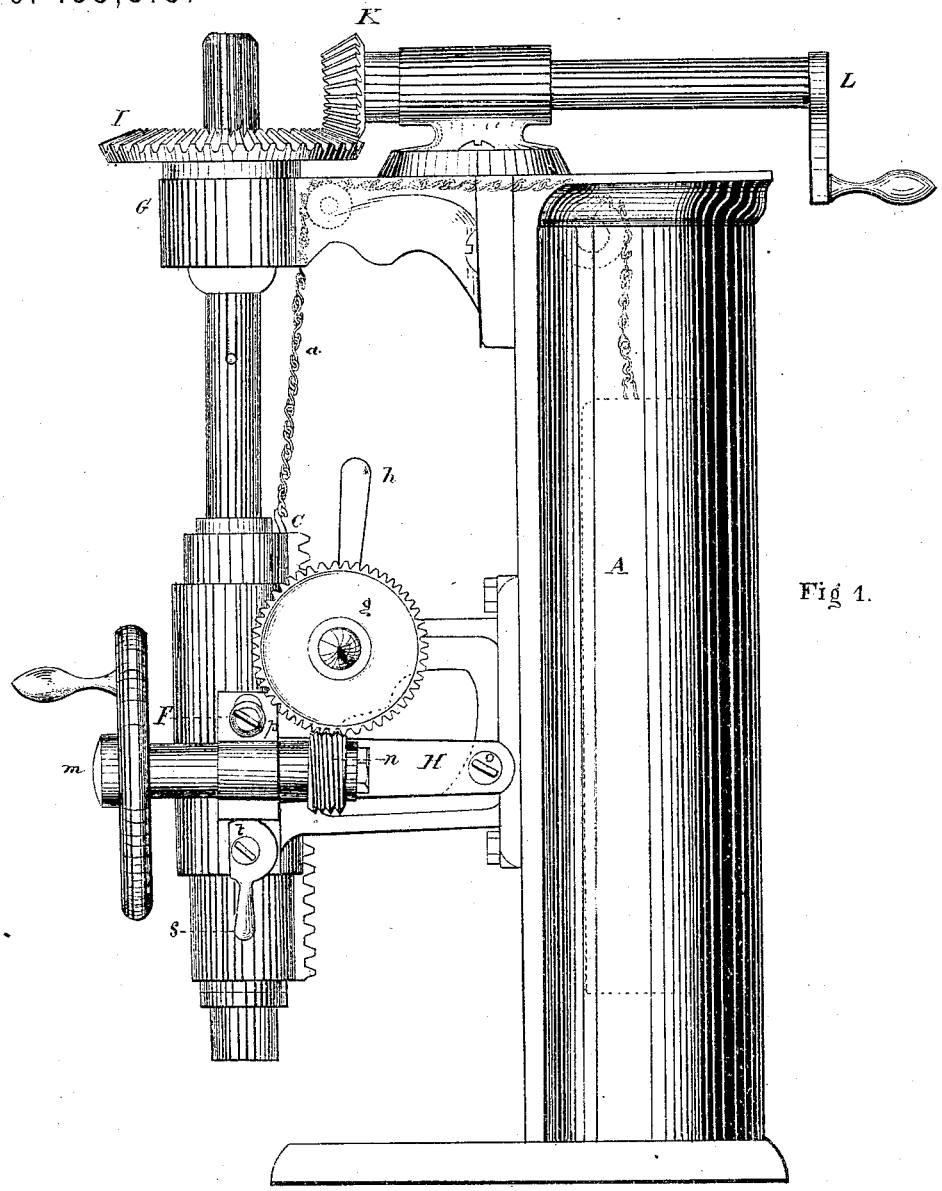
Figure 2:
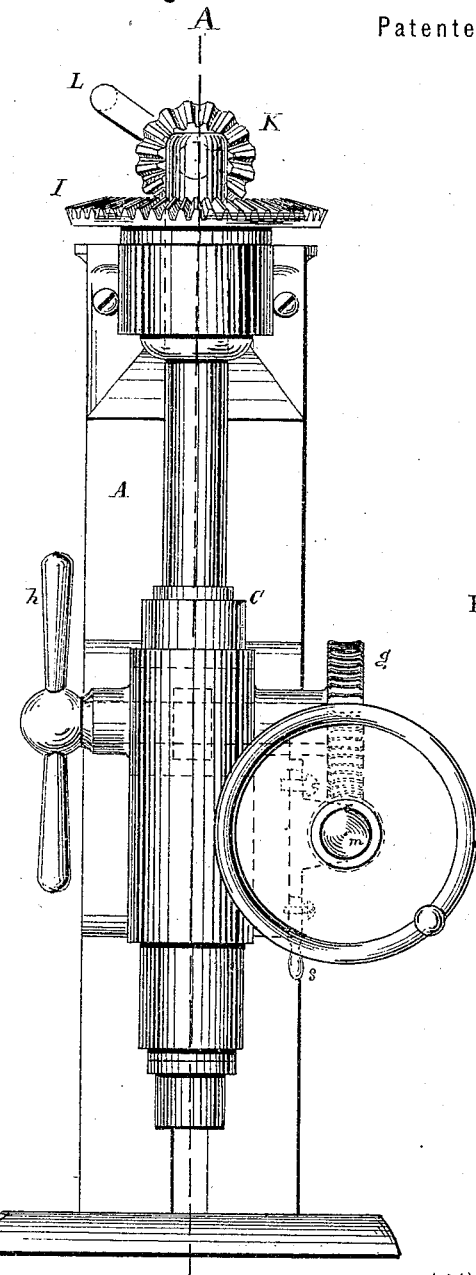
Figure 3:
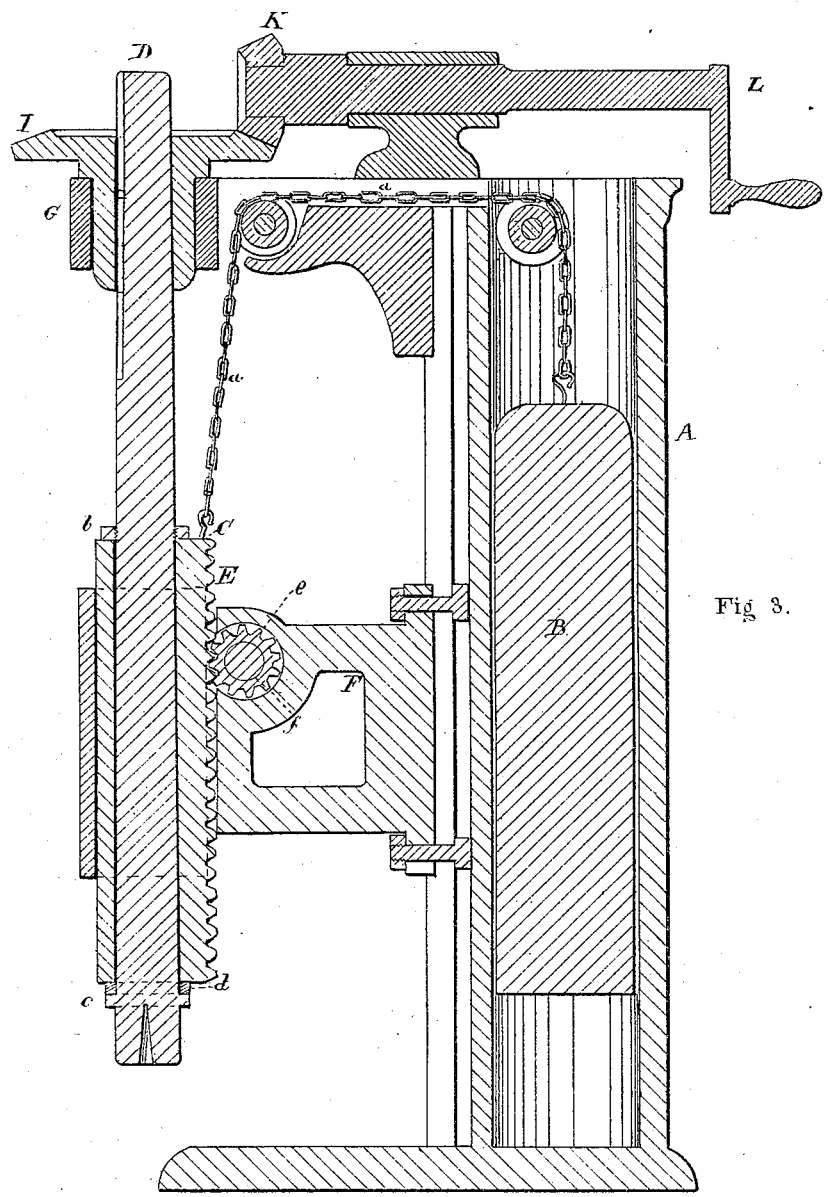

Figure 1 represents a side view of the drill. Fig. 2 represents a front view; and Fig. 3 represents a vertical central section on line A B, Fig. 2.

To enable those skilled in the art to which my invention belongs to make and use the same, I will proceed to describe it in detail.

In the drawing, the part marked A is the main upright frame, and it is made hollow for lightness, and also for the reception of the balance-weight B, which is connected by a cord or chain, $a$, to the tubular drill-spindle bearing C, the latter being held in position on the drill-spindle D by collars $b$ and $c$, a washer, $d$, of rawhide or other suitable material being arranged below the lower end of the bearing-piece C. The bearing-piece C is provided with a rack, E, by means of which it can be raised and lowered by the cog-gear $e$ on shaft $f$, which is supported in suitable bearings in the drill-head F, which is fitted so that it can be slid up and down in the front of frame A, the latter being slotted out for that purpose in the usual manner. Upon one end of the shaft $f$ is fastened a worm-gear, $g$, while through the opposite end is passed a lever-bar, $h$. Below the worm-gear $g$ is arranged upon shaft $m$ a worm, $n$, to fit the gear $g$. Frame H, in which shaft $m$ turns, is hinged at $o$ to the spindle-head F, while its front bearing $p$ is slotted for the purpose of allowing worm $n$ to be dropped down out of mesh with worm-gear $g$, and which operation can be effected by the operator taking hold of handle S of cam $t$, and drawing it forward so as to bring the flat part of the cam under the bearing of shaft $m$, when frame H, shaft $m$, and its worm $n$ will drop sufficiently to let gear $g$ turn freely when its shaft is turned. The top of drill-spindle D is supported by a bearing, G, fastened to the top of frame A, and the spindle is rotated by a gear, I, loose upon its upper end, but having a spline-pin to fit a slot in the spindle, in the usual manner. Gear I receives motion from gear K upon shaft L. Shafts L and $m$ may be operated by hand or by power in any well-known manner. It will be understood that a work-supporting table is to be attached to the frame A in the usual manner, and so arranged that it can be raised and lowered as desired, and then securely fastened to the frame A.

It will be noticed from the foregoing description that the drill-spindle and its movable bearing can both be balanced by the weight within the frame A; and, furthermore, that such balance is not affected or changed when the spindle is raised or lowered, either with or without the head F. This equal balancing of the spindle and its movable bearing is an important feature of novelty, and renders my present drill far more desirable than those in which the balancing is produced by means of levers, since in the latter case the balance is disturbed or changed whenever the spindle is raised or lowered. There is, therefore, no danger of the drill "dropping," when its point passes through the lower side of the work, by reason of "back-lash," since the balance-weight will always hold up both the drill and its movable bearing.

It will also be noticed that the operator, by simply dropping shaft $m$, can throw worm $n$ out of mesh with gear $g$, when by means of lever-bar $h$ he can elevate or depress the drill and its bearing C very quickly to any desired position. This arrangement is found very useful when the drill is to be raised after doing its work, since it saves much time in setting the drill for drilling the next hole.

The balance-weight may be connected to the drill or to its bearing in different ways; but so long as the arrangement or combination is such that the balance is not changed when the drill is raised or lowered, it will embrace my invention in upright drills.

Having described my improved upright drill, what I claim therein as new and of my invention, and desire to secure by Letters Patent, is—

1. The combination, with the spindle and its movable bearing in an upright drill, of a balancing device or mechanism, whereby, when the drill and its bearing and the drill-head are raised and lowered, the balance of the drill will remain the same, for the purposes stated.

2. The combination, with the frame A, spindle and spindle-bearing D C, of the balance-weight B and cord or chain $a$, substantially as and for the purposes set forth.

3. The combination, with drill-head F and drill bearing-piece C, of shafts $f$ and $m$ and gears $e$, $g$, and $n$, substantially as and for the purposes set forth.

4. The combination, with shaft $m$, worm $n$, and their frame, of handle S and cam $t$, as and for the purposes set forth.

PARRITT BLAISDELL.

Witnesses:
E. E. MOORE,
F. L. GOULDING.